(12) United States Patent
Karunaratne et al.

(10) Patent No.: US 7,064,159 B2
(45) Date of Patent: *Jun. 20, 2006

(54) PEARLESCENT WHITE PAINT COMPOSITION CONTAINING A FILM-FORMER AND A SOLID MATERIAL COMPRISING MICA, TITANIUM DIOXIDE AND ALUMINUM, AND PROCESS FOR USING SAME

(75) Inventors: Nirupama Karunaratne, Ontario (CA); Ken Johnson, Ontario (CA); Hiroki Kanaya, Saitama (JP)

(73) Assignee: Honda Canada Inc., Ontario (CA)

( * ) Notice: Subject to any disclaimer, the term of this patent is extended or adjusted under 35 U.S.C. 154(b) by 7 days.

This patent is subject to a terminal disclaimer.

(21) Appl. No.: 10/497,086

(22) PCT Filed: Nov. 29, 2002

(86) PCT No.: PCT/CA02/01810

§ 371 (c)(1),
(2), (4) Date: May 28, 2004

(87) PCT Pub. No.: WO03/046089

PCT Pub. Date: Jun. 5, 2003

(65) Prior Publication Data

US 2005/0065257 A1 Mar. 24, 2005

Related U.S. Application Data

(60) Provisional application No. 60/334,422, filed on Nov. 29, 2001.

(51) Int. Cl.
*C08K 3/08* (2006.01)
*C08K 3/34* (2006.01)

(52) U.S. Cl. .................... 524/459; 524/441

(58) Field of Classification Search ............ 524/430, 524/441, 459
See application file for complete search history.

(56) References Cited

U.S. PATENT DOCUMENTS

| 2,662,027 A | 12/1953 | Pike |
| 3,627,553 A | 12/1971 | Clark et al. |
| 3,709,709 A | 1/1973 | Torok et al. |
| 3,718,494 A | 2/1973 | Jacobson |
| 3,861,946 A | 1/1975 | Waitkins et al. |
| 3,953,643 A | 4/1976 | Cheung et al. |
| 4,359,504 A | 11/1982 | Troy |
| 4,373,963 A | 2/1983 | Uenishi et al. |
| 4,416,940 A | 11/1983 | Loye et al. |
| 4,499,143 A | 2/1985 | Panush |
| 4,546,007 A | 10/1985 | Abe et al. |
| 4,551,491 A | 11/1985 | Panush |
| 4,615,940 A | 10/1986 | Panush et al. |
| 4,780,140 A | 10/1988 | Franz et al. |
| 4,814,208 A | 3/1989 | Miyazaki et al. |
| 4,952,245 A | 8/1990 | Iwano et al. |
| 4,978,394 A | 12/1990 | Ostertag et al. |
| 4,978,708 A * | 12/1990 | Fowler et al. ............ 524/507 |
| 5,009,711 A | 4/1991 | Emmert et al. |
| 5,025,041 A | 6/1991 | Pfenninger et al. |
| 5,234,496 A | 8/1993 | Keiser |
| 5,266,107 A | 11/1993 | Hoffman |
| 5,556,527 A | 9/1996 | Igarashi et al. |
| 5,607,504 A | 3/1997 | Schmid et al. |
| 5,624,486 A | 4/1997 | Schmid et al. |
| 5,624,731 A | 4/1997 | Desjardins |
| 5,626,661 A | 5/1997 | Schmid et al. |
| 5,688,314 A | 11/1997 | Nishimagi et al. |
| 5,702,519 A * | 12/1997 | Nitta et al. ............... 106/442 |
| 5,718,950 A | 2/1998 | Komatsu et al. |
| 5,733,364 A | 3/1998 | Schmid et al. |
| 5,871,827 A | 2/1999 | Jaffe et al. |
| 5,958,125 A | 9/1999 | Schmid et al. |
| 5,964,936 A | 10/1999 | Reisser |
| 6,139,614 A | 10/2000 | Schmid et al. |
| 6,176,918 B1 | 1/2001 | Glausch et al. |
| 6,238,472 B1 | 5/2001 | Andes et al. |
| 6,280,520 B1 | 8/2001 | Andes et al. |
| 6,291,065 B1 | 9/2001 | Poetsch et al. |
| 6,294,010 B1 | 9/2001 | Pfaff et al. |
| 6,350,509 B1 | 2/2002 | Sada et al. |
| 6,398,862 B1 | 6/2002 | Hechler et al. |
| 2001/0033892 A1* | 10/2001 | Iizuka ..................... 427/140 |
| 2002/0043464 A1 | 4/2002 | Miyatake |
| 2002/0076546 A1 | 6/2002 | Johnson |
| 2004/0116554 A1 | 6/2004 | Karunaratne et al. ....... 523/171 |

FOREIGN PATENT DOCUMENTS

| DE | 4432225 A1 | 3/1996 |
| EP | 1160295 A1 | 6/2001 |
| GB | 1032057 | 6/1966 |
| GB | 2360783 A | 2/2001 |

(Continued)

OTHER PUBLICATIONS

Machine Translation of JP 08-165221 A (1996).*

(Continued)

*Primary Examiner*—Peter Szekely
(74) *Attorney, Agent, or Firm*—Morgan Lewis & Bockius LLP

(57) ABSTRACT

A pearlescent white paint composition and use thereof to provide a pearlescent finish on a vehicle. The paint composition is made up of a film-former and a solids material, the latter including mica, $TiO_2$ and particulate metallic Al, in specific amounts.

8 Claims, 11 Drawing Sheets

FOREIGN PATENT DOCUMENTS

| | | |
|---|---|---|
| GB | 2397066 | 7/2004 |
| JP | 03076764 | 2/1991 |
| JP | 08-165221 A * | 6/1996 |
| JP | 11-10081 | 1/1999 |
| WO | WO97/29059 | 2/1997 |
| WO | WO0224777 A2 | 9/2002 |
| ZA | 94505 | 8/1994 |

OTHER PUBLICATIONS

Lewis, Sr., Richard J.; Hawley's Condensed Chemical Didionary 14th Ed., John Wiley & Sons, New York, 2002.*

* cited by examiner

* Honda 2C1B refers to the 2 Coat White Pearl according to the present invention

* 3C1B refers to Conventional 3 Coat System

* Honda 2C1B refers to the 2 Coat White Pearl according to the present invention
* 3C1B refers to Conventional 3 Coat System

* Honda 2C1B refers to the 2 Coat White Pearl according to the present invention

* 3C1B refers to Conventional 3 Coat System

* Honda 2C1B refers to the 2 Coat White Pearl according to the present invention

* 3C1B refers to Conventional 3 Coat System

* Honda 2C1B refers to the 2 Coat White Pearl according to the present invention

* 3C1B refers to Conventional 3 Coat System

PEARLESCENT WHITE PAINT COMPOSITION CONTAINING A FILM-FORMER AND A SOLID MATERIAL COMPRISING MICA, TITANIUM DIOXIDE AND ALUMINUM, AND PROCESS FOR USING SAME

REFERENCE TO CO-PENDING APPLICATIONS

The present application is a 371 of PCT/CA02/01810, filed Nov. 29, 2002 which claims the benefit of U.S. Provisional Appln. No. 60/334,422, filed Nov. 29, 2001 and entitled WHITE PIGMENT FOR USE IN FORMULATIONS INCLUDING WHITE PEARLESCENT PAINT. The entire subject matter of said U.S. Provisional application Ser. No. 60/334,422, filed Nov. 29, 2001 is incorporated by reference. The applicant claims priority benefit under Title 35, United States Code, Section 119(e) of said U.S. Provisional application Ser. No. 60/334,422, filed Nov. 29, 2001 through said PCT filing.

BACKGROUND OF THE INVENTION

The invention concerns white pigments used in paints, lacquers and primers, and for their use in an improved method for the creating a white "pearl" finish on a painted or lacquered surface.

In the automotive industry a pearlescent white finish is a desirable and highly prized finish colour for automobiles and trucks. A pearlescent white finish has been found to be more popular with purchasers than a flat white finish.

Conventionally, in order to create a pearlescent white finish on an automobile, a three step application process is necessary after the exposed metal parts have has been primed with one or more coats of primer. The following steps are employed to create the pearlescent white finish: a base coat of white paint is applied, next a coating of pearlescent material usually containing mica, but which is not pigmented, but rather contains particles of a highly reflective material to provide the "pearl" finish. Finally, a clear coat is applied to seal the underlying layers. Each coating layer must be applied separately, and suitable drying times, and if necessary baking, must be provided prior to the application of each subsequent layer. Consequently the production of a pearlescent finish is labour intensive and time consuming. Whenever coats of two different types of paint are applied to an article, it is necessary to leave a longer drying time than is needed between multiple coats of the same type of paint. In order to facilitate the proper setting of a three coat paint finish, drying times are required to set each of the paint undercoat, the pearl coat and the clear coat. The longer drying times are achieved by having the painted articles on the assembly line for additional periods of time. It is not feasible to simply run the assembly line more slowly through the painting section of an automobile assembly plant in order to create longer drying times between paint applications. Instead, the entire assembly line must be lengthened to provide the further travel time during which paint drying can occur. It follows that in order to make the assembly line longer, a larger physical plant space is needed through which to run the assembly line. In manufacturing plants where physical space is at a premium, it may not be possible to set aside additional assembly line length to facilitate multiple times between the application of multiple paint coats. Accordingly, it may be impossible to offer certain paint finishes on vehicles manufactured at some smaller manufacturing plants.

U.S. Pat. No. 5,871,827 to Jaffe et al. (the entire subject matter of which is incorporated in by reference) discloses two coat and three-coat automotive finishes and a process for their preparation wherein polychromism is achieved in incorporating an opaque light interference pigment into to the top coat or the mid coat. The processes taught by Jaffe involve the use of two coating layers, the first of which contains an opaque white, black or coloured pigment to achieve total hiding and the second layer being an interference pigment so that it does not hide the first coating. A clear topcoat is still applied over the pigmented coats in order to compete the finish. Moreover, the particles of opaque interference pigment taught are multi-layered particles having an opaque layer coated with a transparent dielectric layer, in turn coated with a semitransparent layer. This would be a relatively complex and expensive coating process to apply, and the result of the process are polychromatic paint effects.

U.S. Pat. No. 5,350,509 to Sada et al. (the entire subject matter of which is incorporated in by reference) discloses a coating structure that includes a colour base, a first coating layer placed on the colour base, and transparent brilliant members contained in the first coating layer, each brilliant member including an alternate lamination of at least two polymers having different refractive indexes and controlling interference light resulting from reflection interference produced by alternate lamination and transmitted light other than interference light.

U.S. Pat. No. 4,499,143 to Panush (the entire subject matter of which is incorporated in by reference) discloses a transparent topcoat composition containing low pigment to binder ratio of iron oxide encapsulated in mica particles. The teachings of Panush are particularly addressed to producing coloured finishes having depth, clarity and chromaticity. Although this patent states that mica encapsulated iron oxide pigments have inherent hiding capabilities in addition to being pearlescent, they are said to be additive colours. These desired colour results are stated not to be obtainable with metals (i.e aluminum) and previous pearlescent pigments (natural or synthetic). These so called "colorless and opaque pigments reduce the value of the true coloured pigments and resulting in gray-cloudy-low chroma colours. In view of the focus on coloured finishes, this patent fails to recognize and teach the value of aluminum as a pigment and hiding material in pearlescent white finishes.

U.S. Pat. No. 4,615,940 to Panush (the entire subject matter of which is incorporated in by reference) discloses an opalescent colour effect on a substrate utilizing a multicoat system in which a coloured primer is applied to a surface, followed by a transparent basecoat, and then a clearcoat. This transparent basecoat should tend to have poor hiding qualities, and relatively high light transmittance. In order to compensate for this feature of the basecoat, primers with very effective black and white hiding would be required, and further measures would be necessary to block UV light levels, otherwise there could be significant electrocoat degradation through the transparent basecoat. Additionally, the use of a transparent basecoat requires that the primer layer must be applied carefully and sanded thoroughly, since the transparent basecoat would fail to mask defects in the primer coat.

In the case of conventional titanium dioxide white paint, very large amounts of titanium dioxide pigment must be added to the paint medium in order to achieve adequate hiding power at a reasonable film thickness, typically 30 to 50 microns for conventional painting applications. The paint formulation has very little ability to hold more solid particulates, so there is little room in the paint mixture left to add a pearlizing material such as particles of mica. It is already known that adding mica to a conventional white titanium dioxide paint does not change the visible appearance of the white paint. Conventional titanium dioxide-based white paint, that is paint having a titanium content exceeding 90 percent, of the pigment portion, continues to have a "flat" white appearance despite the addition of a pearlizing material.

Solvent base paints can carry from 40 to 60 percent pigment. Water based paints and primers, on the other hand, do not atomize the pigment as well. Accordingly, the maximum of pigment loading should be much lower, for example in the range of 20 to 35 percent. In each case, for conventional white paint, 90 percent of the pigment must be white pigment, namely titanium dioxide.

It is believed that the mica flakes are drowned in the large quantity of titanium dioxide pigment which is needed to create conventional white paint, and the pearlized appearance of the mica is lost to the eye.

In order to create a conventional painted finish which has a white pearlescent appearance, it has been necessary to apply a pearl coating of mica or another pearlizing material after the white titanium dioxide paint has set in place in order to prevent the "drowning" of the pearlizing material. A conventional pearl coat has no hiding power of its own. The pigmented base coat is required for the hiding properties of the finish, so as to cover sand marks etc. on the article and to create the actual colour of the painted article. The pearl coat merely gives the shiny characteristic that converts a "flat" finish into a "pearl" finish. The titanium dioxide white base-coat and the pearl coat are two different types of paints which require distinct flash times in order to set the coats before other substances are applied to the surface. If no flash time is allowed between the application of a pigmented base coat and a pearl coat paint striking will occur between the coats. Paint striking is a painting flaw which occurs when the dyes or pigments from a previous paint layer become dissolved in the solvents of a newly applied material and seep through to alter the finish colour of the newly applied material. Striking is caused by the application of two different types of paint coatings without a long enough flash time between the application of the two coatings. The application of the separate mica pearlizing coating necessitates a separate application step which requires significant adaptation of automotive production lines and causes a substantial increase in the painting cost of each vehicle produced. The effect of exposure to sunlight is the fundamental cause of the weathering deterioration of most materials. The primary component of paint weathering is photo degradation.

The wavelength distribution of sunlight that reaches the Earth's surface is important because of the relative effect on the material caused by each wavelength region.

Sunlight can be divided into three major regions: ultraviolet (UV), visible, and infrared (IR). Each region has its own distinct wavelength range.
1. UV wavelengths less than 400 nm 6.1% composition of the sunlight.
2. Visible wavelengths between 400–700 nm—51.8% composition of sunlight.
3. Infrared wavelengths above 700 nm—42.1% composition of the sunlight.

The visible region contributes to the largest portion of the overall solar energy; however, it is the UV portion of the sun's energy that is the most destructive element. The ultraviolet by itself can be divided into three distinct wavelength ranges; only the UVA and the UVB reach the Earth's surface.

| RANGE | WAVELENGTHS (nm) |
|-------|------------------|
| UVC   | Less than 280    |
| UVB   | 280–320          |
| UVA   | 320–400          |

There is no UVC at Earth's surface as wavelengths below 293 to 300 nm are filtered out by the atmosphere. The shorter the UV wavelength, the more damaging its effects on materials. The UVA and the shorter wavelength UVB are responsible for most photo degradation. Therefore the range of sunlight that comprises the smallest percentage of the solar spectrum is the primary cause for material degradation Photodegradation occurs as a result of light energy breaking a chemical bond in the exposed material, causing a deterioration of the physical structure. As the wavelength becomes shorter, the energy of each individual packet becomes greater, allowing the photon to break progressively stronger molecular bonds. Thus chemical structures able to withstand irradiation at 350 nm may not be able to endure radiation at 320 nm. As the energy level in the photons increases, however, there is a reduction in quantity available.

The first law of photochemistry states that only light that is absorbed can cause damage. Thus, if the absorbance of the damaging UV energy can be prevented or otherwise reduced, deterioration will be slowed. This premise forms the basis for much of the research in paint formulation.

The visible portion of the solar spectrum is responsible for a limited amount of physical degradation and only in a few materials that are susceptible. Some dyes and pigments are sensitive to wavelengths in the lower regions of the visible spectrum. This manifest a colour changes in most materials but without changes to other physical properties.

The infrared region causes heat buildup to occur on radiated specimens, but has not otherwise been associated with causing significant deterioration to occur. The IR is a factor in the deterioration because absorption of these wavelengths cause specimen temperature to rise, which in turn leads to an increase in the rate of photo degradation.

While important strides have been made over the years to improve UV protection for coatings, there remains a need for an improved pearlescent coating with UV filtering capabilities.

It is therefore an object of the present invention to address at least some of the above mentioned disadvantages.

SUMMARY OF THE INVENTION

According to one of its aspects, the present invention provides a white pigment comprising one or more pigment components selected from the following group; aluminum, zinc, copper/zinc alloy, stainless steel, nickel, and selected metal salts. In particular, a white pigment is presented comprising one or more of the salts selected from the following group: aluminum oxide, aluminum silicate, hydrated magnesium aluminum silicate (talc), silica, mica (k2O.3Al2O3.6SiO2.2H2O), aluminum silicate, magnesium oxide, calcium carbonate, calcium sulphate, calcium meta-silicate, anhydrous sodium potassium aluminum silicate, sodium aluminum silicate, alumina trihydrate, barium sulphate. More particularly the white pigment is comprised of aluminum oxide, and a pigment formulation, being a paint, lacquer or primer is comprised thereof. A pearlescent white paint can be formulated by providing a paint formulation to which is added the white pigment and a pearlizing material. A process for producing a pearlescent white finish on an object comprises the steps of applying to the object at least one base coat of the pearlescent white paint formulation according to the invention, setting the base coat, applying a clear coat to the base coat and setting the clear coat.

In one embodiment, the percentage of aluminum oxide by weight within the range is between about 0.1% and about 50%. A pigment formulation for a base coat paint may have a percentage of aluminum oxide by weight within the range between about 0.1 and about 20%. A pigment formulation for a primer may have a percentage of aluminum oxide by weight within the range between about 0.1 and about 10%.

In one embodiment, the pigment includes a titanium portion, preferably in the form of one or more of its salts, such as titanium dioxide.

In another of its aspects, there is provided a method for producing a pearlescent white paint comprising the steps of:
 a. providing a paint formulation;
 b. adding thereto a white pigment comprising one or more of the salts selected from the group: aluminum oxide, aluminum silicate, magnesium oxide, calcium carbonate, calcium sulphate, barium sulphate; and,
 c. adding thereto a pearlizing material.

In one embodiment, the base coat is applied to a thickness of approximately 7 to 25 micrometers and may be set by ambient flash dehydration and/or baking in an oven. A clear coat may also be applied to a thickness of approximately 35–45 micrometers In still another of its aspects, the present invention provides a process for producing a pearlescent white finish on an object comprising the step of: applying to the object at least one base coat of a pearlescent white paint formulation comprising a white pigment comprising one or more of the salts selected from the group: aluminum oxide, aluminum silicate, hydrated magnesium aluminum silicate, silica, mica, aluminum silicate, magnesium oxide, calcium carbonate, calcium sulphate, calcium metasilicate, anhydrous sodium potassium aluminum silicate, sodium aluminum silicate, alumina trihydrate, barium sulphate.

In yet another of its aspects, there is provided a method of forming a finished vehicle paint coating of a predetermined colour, comprising the steps of:
 a. forming at least one base layer, the at least one base layer having colour characteristics which are at least partially determinative of a colour of the finished vehicle paint coating;
 b. forming, on the at least one base coat, a pearlescent layer, the pearlescent layer containing at least one pearlescent constituent to impart a pearlescent effect on finished vehicle paint coating and at least one physical-defect-hiding constituent to hide physical defects present on the at least one base layer of a roughness not exceeding 500 grit.

In yet another of its aspects, there is provided a method of forming a finished vehicle paint coating of a predetermined colour; comprising the steps of:
 a. forming at least one base layer, the at least one base layer having colour characteristics which are at least partially determinative of a colour of the finished vehicle paint coating;
 b. forming, on the at least one base coat, a pearlescent layer, the pearlescent layer containing at least one first pearlescent constituent to impart a pearlescent effect on finished vehicle paint coating and at least one second constituent, without which physical deformations in the at least one base layer are visible in the finished vehicle paint coating.

In still another of its aspects, there is provided a pearlescent coating for a vehicle of a particular vehicle colour, comprising an e-coat and an outer coating portion applied to the e-coat, the outer coating portion including at least one colour-containing primer layer applied to the e-coat layer and a pearlescent coating applied to the primer layer, the outer coating portion being capable of absorbing about 85 percent of UV radiation landing on the coating.

In still another of its aspects, there is provided a pearlescent coating for a vehicle of a particular vehicle colour, comprising an e-coat and an outer coating portion applied to the e-coat, the outer coating portion including at least one colour-containing primer layer applied to the e-coat layer and a pearlescent coating applied to the primer layer, the primer layer having a thickness ranging from about 15 to 35 microns, the pearlescent layer having a thickness ranging from about 11 to 20 microns, wherein the outer coating portion is capable of absorbing about 85 percent of UV radiation exposed to the coating.

In still another of its aspects, there is provided a pearlescent coating for a vehicle of a particular vehicle colour, comprising an e-coat and an outer coating portion applied to the e-coat, the outer coating portion including at least one colour-containing primer layer applied to the e-coat layer and a pearlescent coating applied to an outer surface of the primer layer, wherein the pearlescent layer is capable of hiding physical deformations present on the outer surface formed by a sandpaper no coarser than about 500 grit In still another of its aspects, there is provided a pearlescent coating for a vehicle of a particular vehicle colour, comprising an e-coat and an outer coating portion applied to the e-coat, the outer coating portion including at least one colour-containing primer layer applied to the e-coat layer and a pearlescent coating applied to an outer surface of the primer layer, the outer surface having at least one localized remedial repair region formed by sanding with a sandpaper having a grit ranging from 500 to 800, wherein the pearlescent layer is capable of concealing the presence of the localized remedial repair region to the naked eye.

In still another of its aspects, there is provided a method of forming a finished paint coating of a predetermined colour, comprising the steps of:
 forming at least one base layer, the at least one base layer having colour characteristics which are at least partially determinative of a colour of the finished paint coating; and
 forming, on the at least one base coat, a pearlescent layer, the pearlescent layer containing at least one pearlescent constituent to impart a pearlescent effect on finished paint coating and at least one physical-defect-hiding constituent to hide physical defects present on the at least one base layer.

In one embodiment, the forming steps are carried out using a water based carrier.

BRIEF DESCRIPTION OF THE DRAWINGS

Several preferred embodiments of the present invention will now be described, by way of example only, with reference to the appended drawings in which.

DETAILED DESCRIPTION OF THE INVENTION

Figure 1:
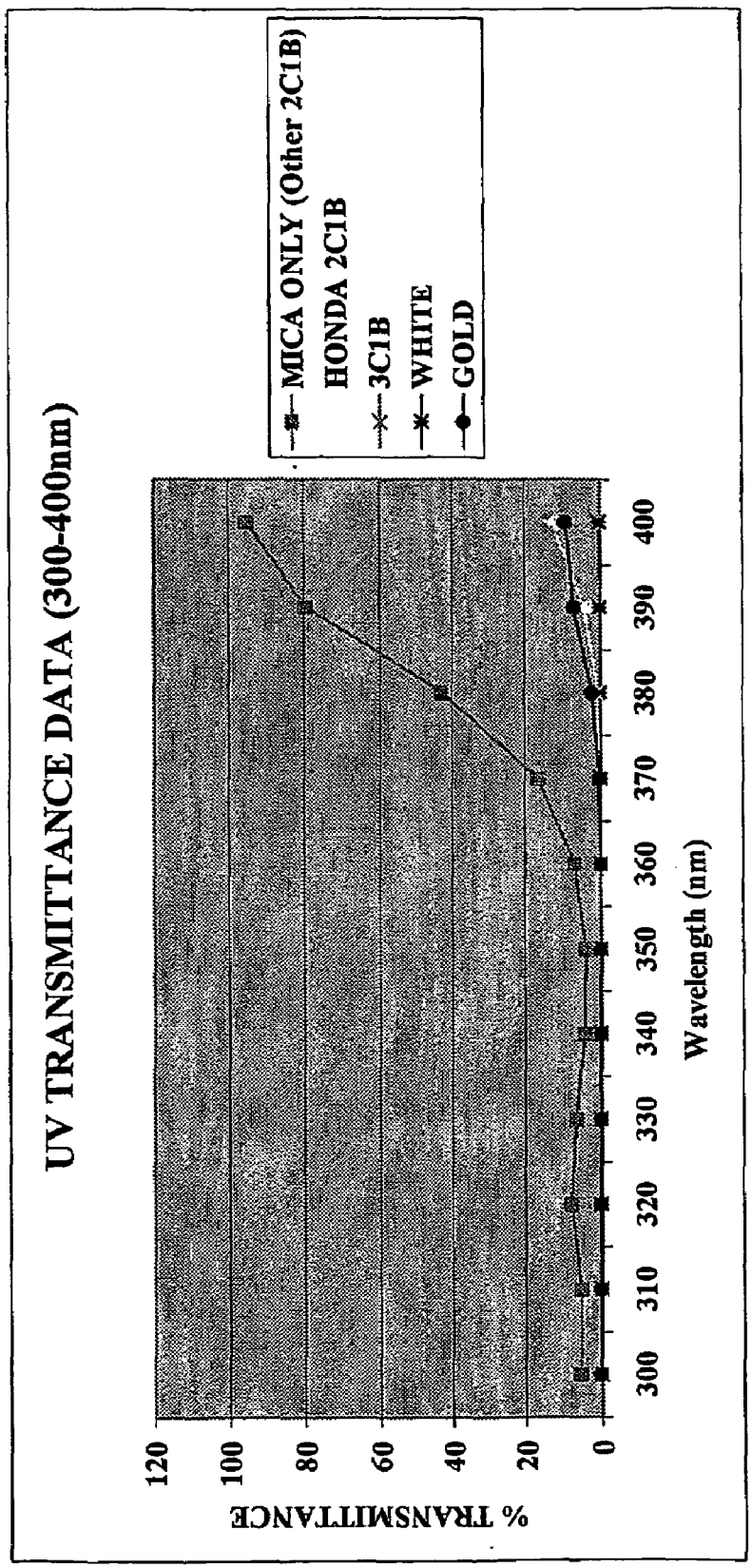
FIGS. 1 to 7 are plots of wavelength versus percent light transmittance for several coatings.

Herein below, reference is made to pigment loading or percentage of pigments. For clarity, the pigment concentration is assumed to be 100 percent of the paint, but will not, in fact be 100 percent, given the need for solvents, binders and the like.

"Hiding Power" is a quantitative factor which is critical in determining the make up of paints. Hiding Power may be quantitatively defined as the property of a paint that enables it to completely hide any background over which it is sprayed. Generally speaking, it is accepted within the paint industry that complete hiding is achieved when the paint applied over a black background has a reflectance value of 0.98 of that applied in equal thickness over a white background. This means that Hiding Power is a contrast ratio of the background and the thickness of paint which is required to reduce the contrast difference to 0.02. The standard figure of 0.02 is based upon the Weber-Fechner contrast law which states that differences of less the 2% (0.02) are imperceptible to the human eye in conditions of moderate illumination.

Hiding Power is produced by the light absorbing properties of pigment particles in a film of paint as applied to a painted surface. If much of the light emerges from the top of the surface of the paint film, and the substrate is not obscured, then the film of paint hides poorly. Most pigments are crystalline in nature. In particular, white pigments when dispersed in a paint medium tend to scatter light strongly. If a single crystal of white pigment were grown sufficiently large, it would be perceived as a shine and transparent glass-like crystal. This light scattering characteristic results in large amounts of light emerging from the surface of the paint film, with corresponding poor hiding power.

Titanium dioxide ($TiO_2$) is the most common white pigment for use in paint. Unfortunately, this pigment has a relatively poor hiding power. In order to maintain the white colour, no other coloured pigments, which would by definition have greater hiding power, can be added to improve hiding properties. Accordingly, conventional white base coats are heavily laden with titanium dioxide pigment. This means that in order to achieve a white paint colour with black and white hiding properties at less than 35 microns, the paint must contain at least 90% titanium dioxide by weight. This pigment content is approaching the maximum pigment content allowable in a paint formulation which will still permit the paint to flow and be effectively sprayed onto surfaces. By contrast, other paint colours which contain pigments which have more effective hiding power may contain on the order of 5% by weight of pigment.

In accordance with one embodiment of the present invention, it has been determined that aluminum oxide ($Al_2O_3$) may be advantageously used as a white pigment. Aluminum oxide pigment can be effectively formulated into paints, lacquers and primers. The substitution of aluminum oxide instead of titanium dioxide can be made with a pigment loading in the range from 0.1% to 50% of the total pigment content of the formulation by weight. The percentage will alter the desired colour position of the paint relative to the required hiding power. Pigment loading of aluminum oxide to formulate white base coat paint can be in the range of 0.1%–20% by weight. If aluminum oxide loading is taken beyond 20% by weight, the overall colour of the paint will begin to take on a bluish/gray cast. In certain instances a clear coat finish can be adjusted slightly toward yellow in order to compensate somewhat for the bluish/gray tone. The preferred aluminum oxide pigment loading for a primer is within the range of 0.01%–50% by weight. A preferred white aluminum oxide pigment loading range for is between 0.01 and 25% by weight.

A reason that the pigments according to one embodiment of the present invention can be substituted with much lower pigment loading (determined in weight percent of the paint) when compared with conventional white titanium dioxide pigment is that the pigments according to one embodiment of the present invention, and in particular aluminum oxide has a much improved hiding power value than titanium dioxide. Accordingly less pigment is necessary to achieve the same 'hiding' capability.

The most desirable replacement for titanium dioxide for use as a pigment is aluminum oxide. It is cheaper than titanium dioxide and has better hiding characteristics.

Although aluminum oxide is the preferred material for use as a white pigment according to one embodiment of the present invention, other metal and salts can also be used as white pigments. More particularly, one or more of the metal salts selected from the group comprising: aluminum oxide, aluminum silicate, hydrated magnesium aluminum silicate (talc), silica, mica ($k2O.3Al2O3.6SiO2.2H2O$), aluminum silicate, magnesium oxide, calcium carbonate, calcium sulphate, calcium metasilicate, anhydrous sodium potassium aluminum silicate, sodium aluminum silicate, alumina trihydrate, barium sulphate can be used as a white pigment. Moreover, in certain instances, one or more of the above listed metal salts may be combined in a white pigment together with the preferred pigment component, aluminum oxide. The metal salts listed above vary in effectiveness for use as a white pigment. As the hiding power of the salt decreases, so to does its effectiveness as a pigment, since greater loading of the salt would be required in order to achieve effective hiding properties of the paint, lacquer or primer into which the pigment is being formulated.

The use of barium sulphate is the least recommended of the group of metal salts. Not only does it have less favourable hiding power, but also, the use of barium sulphate as a pigment may cause the resulting paint or primer to take on an unattractive milky appearance under certain conditions.

Other substances have higher hiding powers than titanium dioxide, though for environmental or other paint formulation reasons, they are not desirable alternatives to titanium dioxide white pigment. Such undesirable alternatives include the oxides of lead, zinc, and antimony, and the use of these salts as pigments is discouraged.

The particle size of the pigment according to one embodiment of the present invention may also be varied to improve the effectiveness and hiding power of the pigment in a paint or primer formulation.

A paint primer can be advantageously formulated by substituting a pigment according to one embodiment of the present invention in place of, or alternatively to replace part of the titanium dioxide pigment conventionally used in primers. If aluminum oxide is used as, or in, the white pigment, the heavy loading of pigment traditionally formulated to create a primer can be decreased by approximately 0.1 to 60 percent. In other words the substitution of aluminum oxide as the white pigment in place of part or all of the titanium dioxide will decrease the overall weight percent of pigment needed for the desired hiding properties of a primer.

Decreasing the pigment loading has the beneficial effects of improving the flow properties of the primer, and simplifying the manufacturing process for the primer by reducing the grinding time necessary to make the primer. With the replacement pigment according to one embodiment of the present invention, a thinner primer is created. The coating which can be achieved with a thinner primer results in better coverage of articles being primed. When the amount of pigment in primer is decreased, it follows that the overall solid content of the primer is decreased, and there is less likelihood of the build up of solid pigment particles as a sludge in primer containers, spray nozzles and hoses.

There may be cases where a white pigment may be formulated containing a proportion of titanium dioxide and another proportion of aluminum oxide. In this case, the aluminum oxide contributes to hiding while the titanium dioxide tends to offset a colour shift to blue/gray by the aluminum oxide, or another colour shift by other pigment constituents.

The use of a white pigment according to one embodiment of the present invention in place of titanium dioxide in primer provides the necessary hiding properties of the primer to be achieved without heavy pigment loading. The decreased pigment loading eliminates the need to add conventional hardening retardants to permit the primer to flow sufficiently for spraying applications. The elimination of hardening retardants is advantageous, since the use of hardening retardants in primers creates several undesirable side-effects which can be eliminated if the retardants are not used. Hardening retardants can cause the primer to have a very short working time frame for application. Also, if retardants are used, there is a greater risk of sagging or popping of paint and uneven spray coverage. Sagging is a painting flaw which results from gravity acting upon a wet paint coating applied to a vertical surface. Sagging appears as a downward flow of the paint on the painted surface. High density levels of pigment within paint and the use of thick coats of paint aggravate the sagging phenomena. Popping is a paint flaw which is caused by the formation and bursting of bubbles near the surface of a layer of paint applied to an article. Popping can occur when the surface viscosity of a paint increases to a high level while volatile material remains within the lower levels of the paint film. The probability of popping increases with the film thickness of a paint layer since there is a greater chance for developing a differential in solvent content in a thicker paint layer. In order to avoid these undesirable deficiencies in spray coverage, multiple thin coats of primer or paint must be used, thus increasing processing times and accompanying costs. The undesirable effects may also result in substandard coverage on finished painted articles, and such deficiencies must be detected during inspection and then repaired, also resulting in lost productivity and production efficiency. The use of aluminum oxide and/or one of the other pigments in accordance with the present invention results in a primer with improved hiding properties with less pigment loading. The improved flow properties of a primer formulated according to one embodiment of the present invention alleviate the undesirable effects discussed.

The white pigment according to one embodiment of the present invention is particularly effective for use in the creation of a pearlescent white finish on painted articles including automobiles and trucks. An exemplified pearlescent coating is shown schematically at 10 in FIG. 1*a* which is formed on a metal surface 12 with an ecoat layer 14. In this case, a colour base layer 16 is applied to the ecoat layer 14 and a pearlescent layer 18 is applied on the colour base 16 and finished with a clear coat layer 20. In this case, the pearlescent layer 18 provides both a first pearlescent constituent and a second constituent which contributes to hiding, but in a manner which does not overpower or drown out the pearlescent effects imparted on the coating by the first pearlescent constituent. This dual constituent makeup, and thus dual function, of the pearlescent coating is represented by the two directional cross-hatching. The details of the pearlescent coating are described in more detail herein below.

Figure 1A:
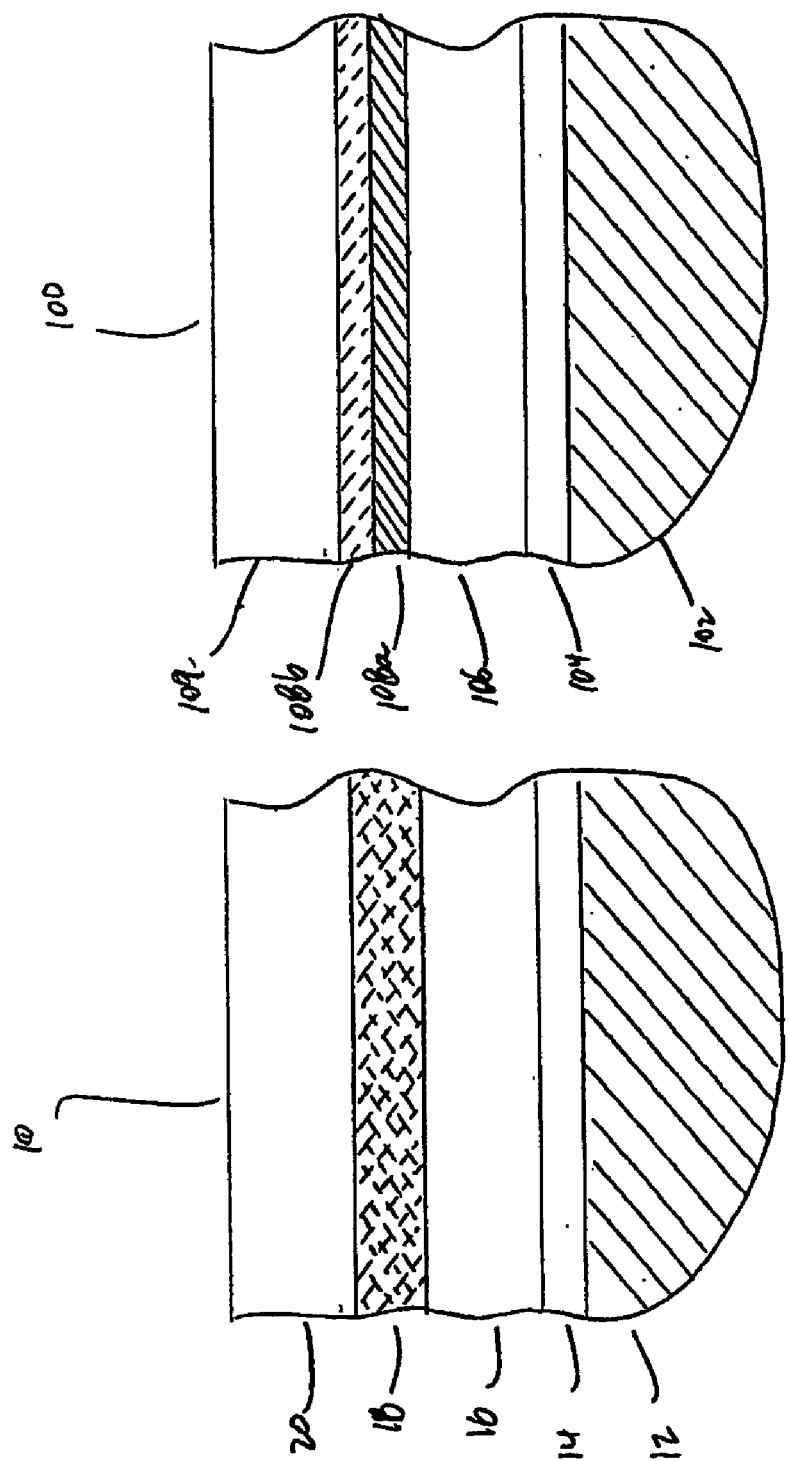
FIG. 1a is a schematic representation of two coatings.
Figure 2:
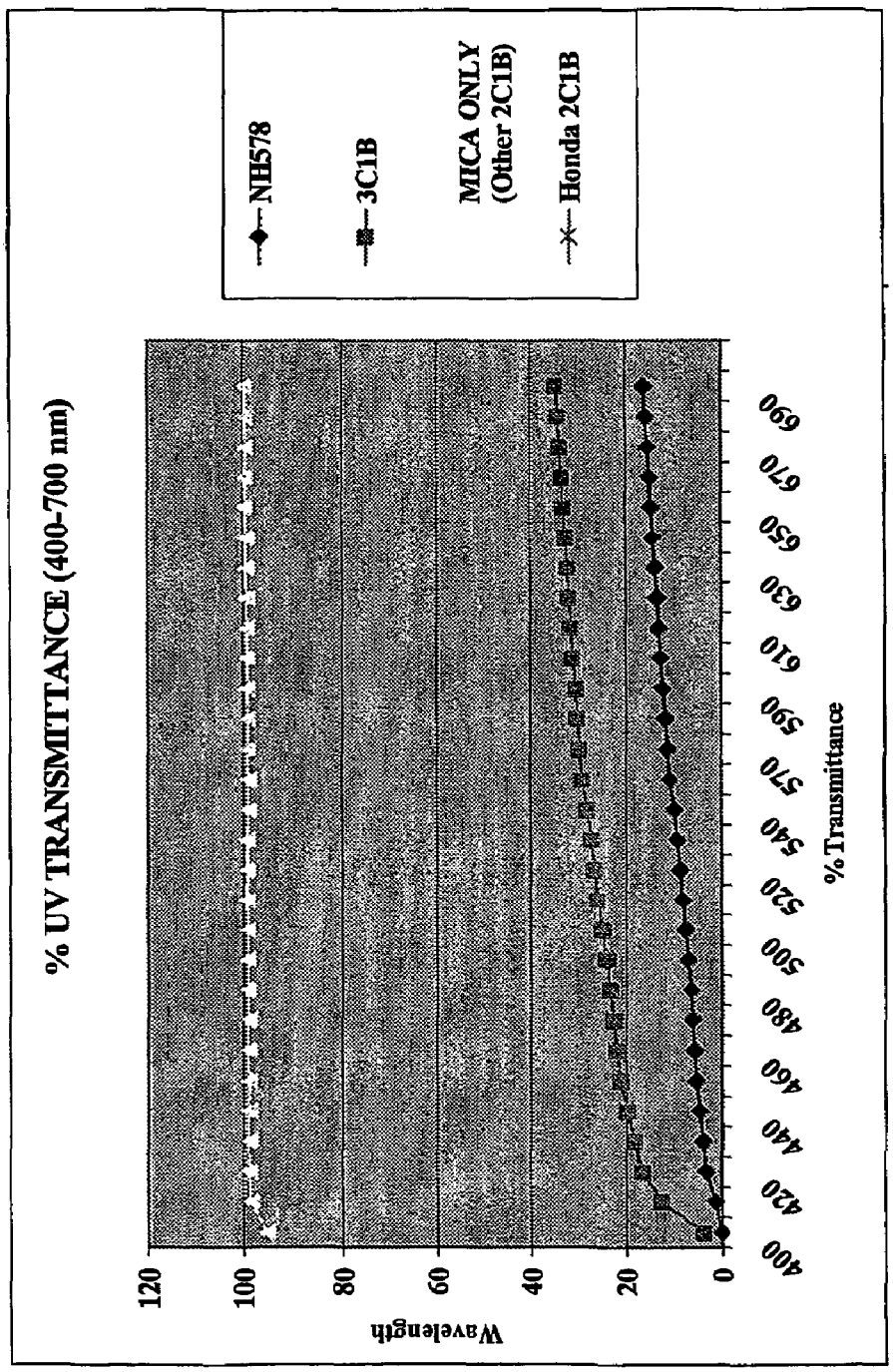
Figure 3:
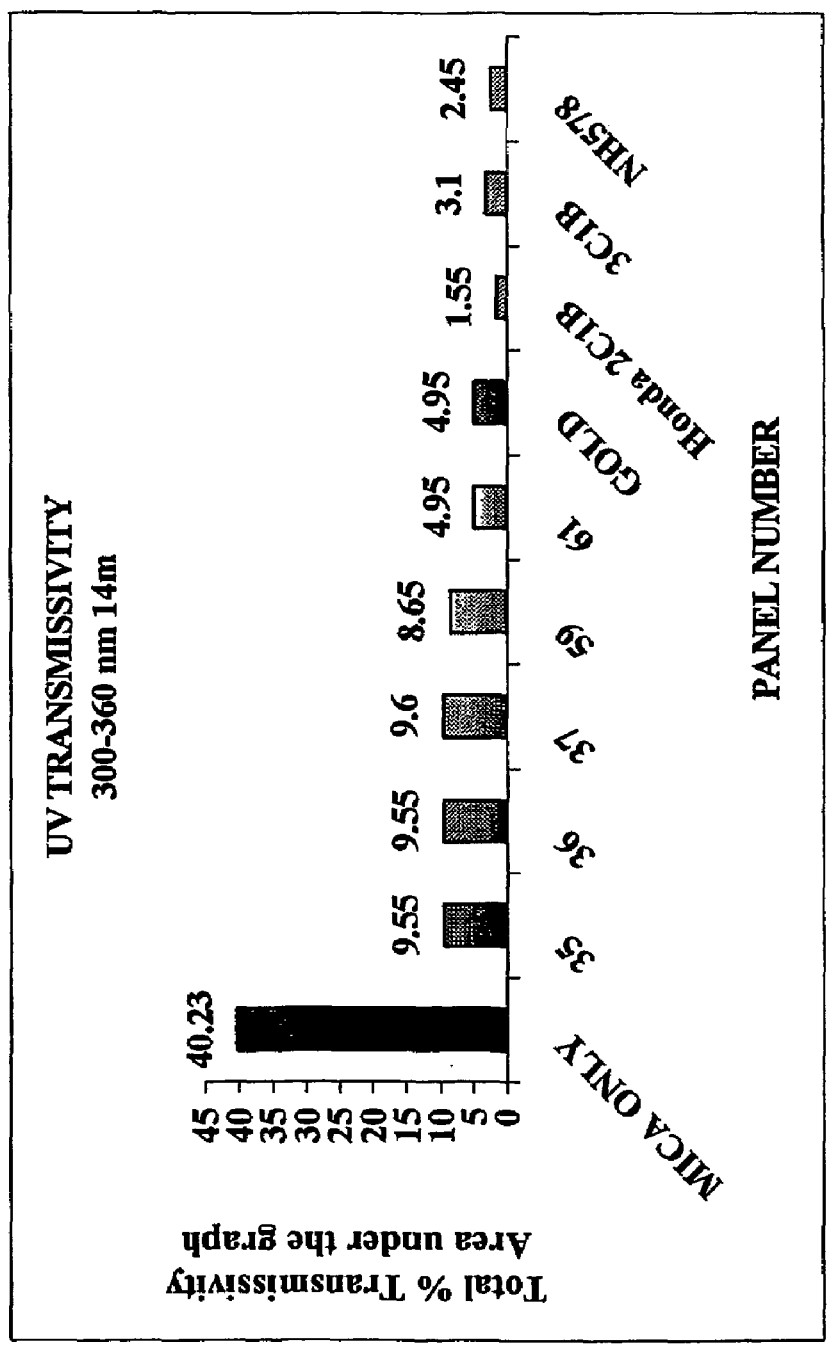
Figure 4:
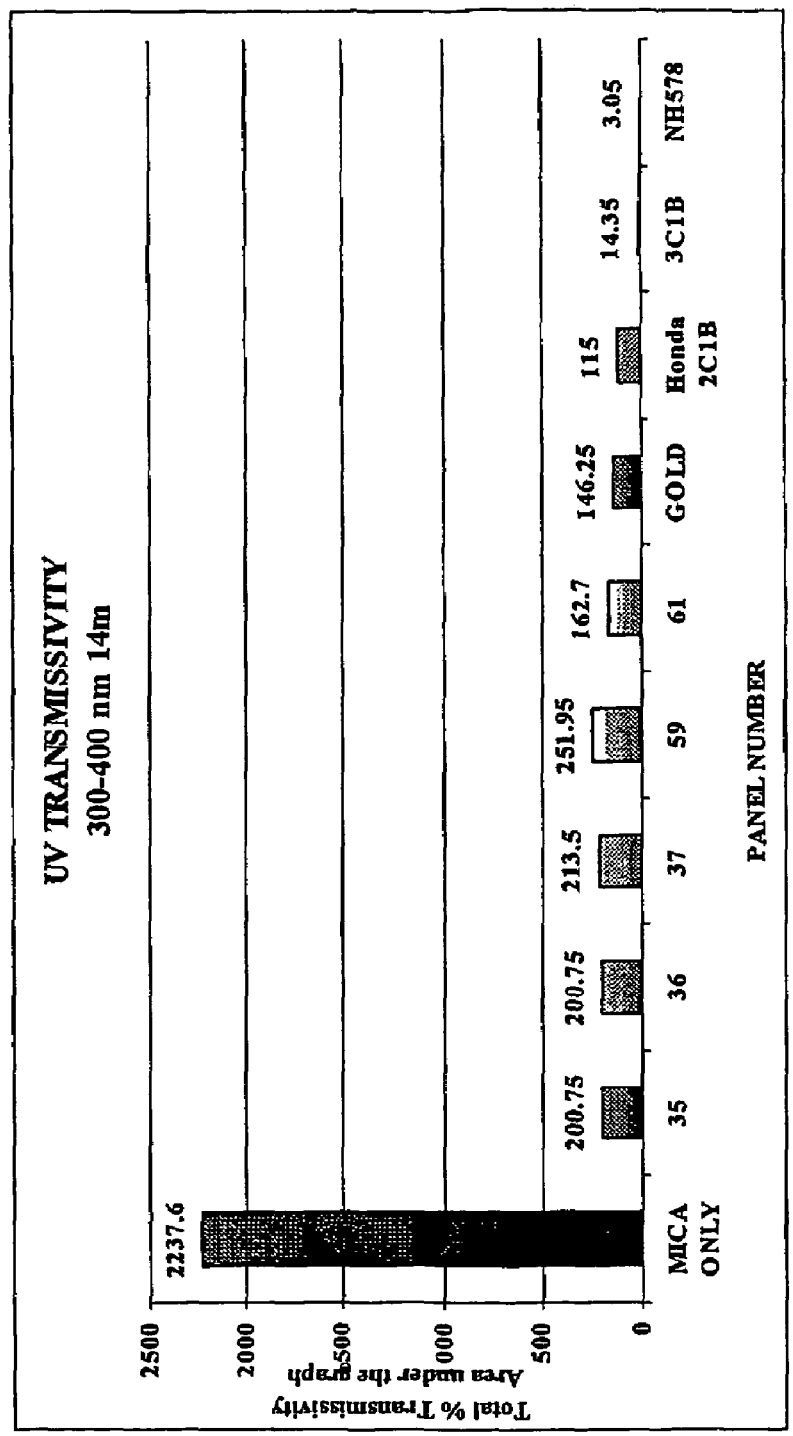
Figure 5:
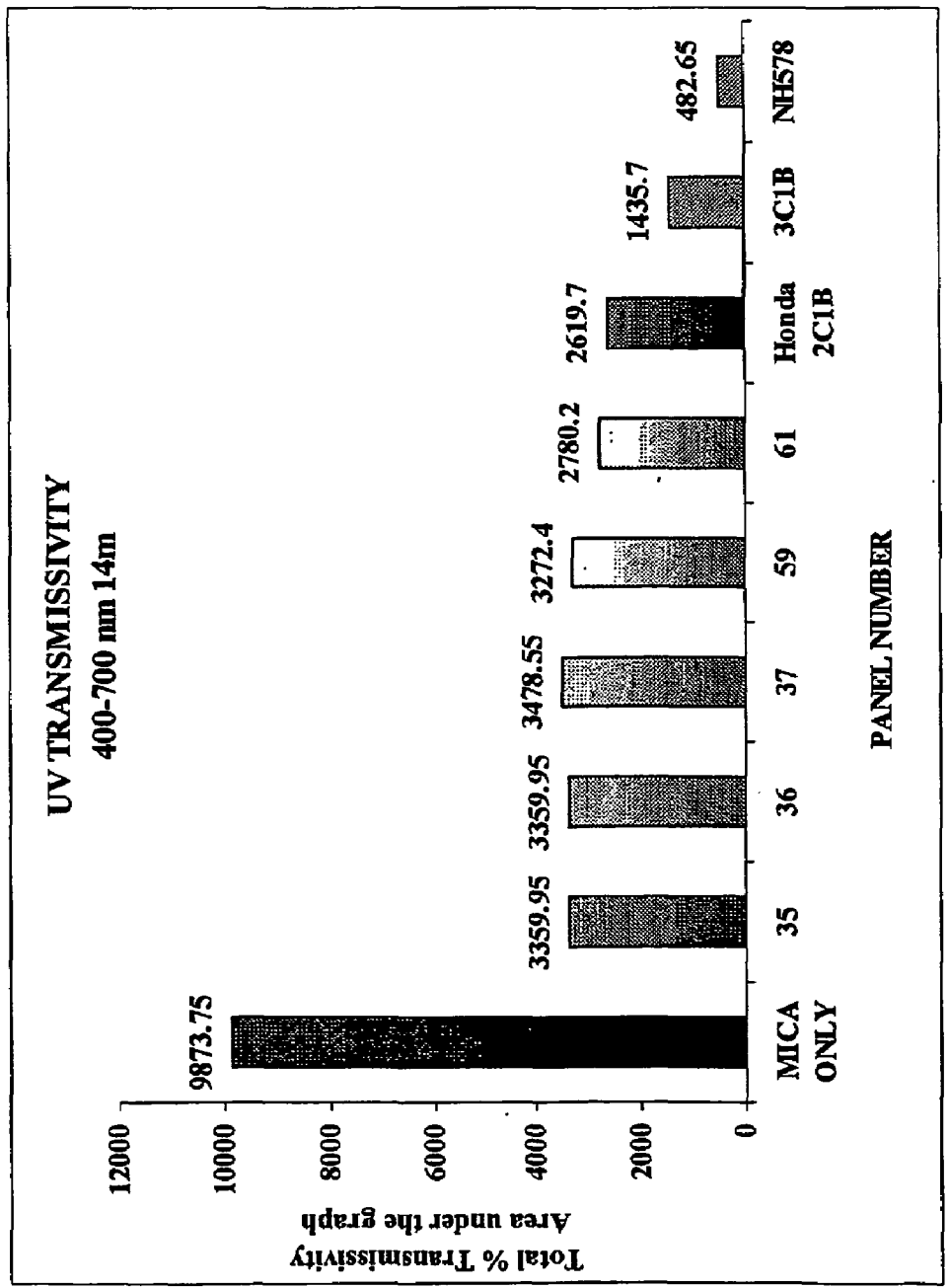
Figure 6:
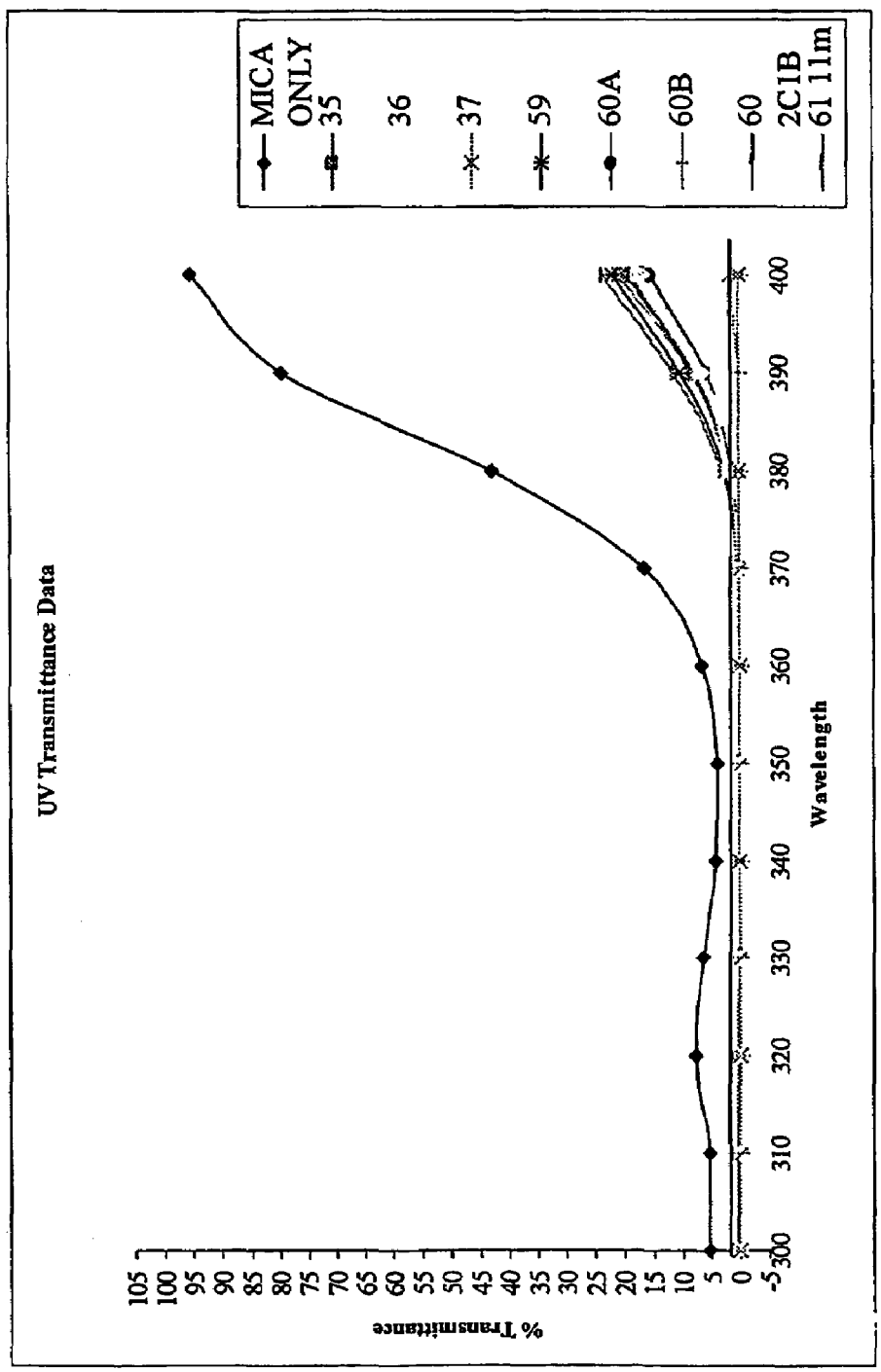
Figure 7:
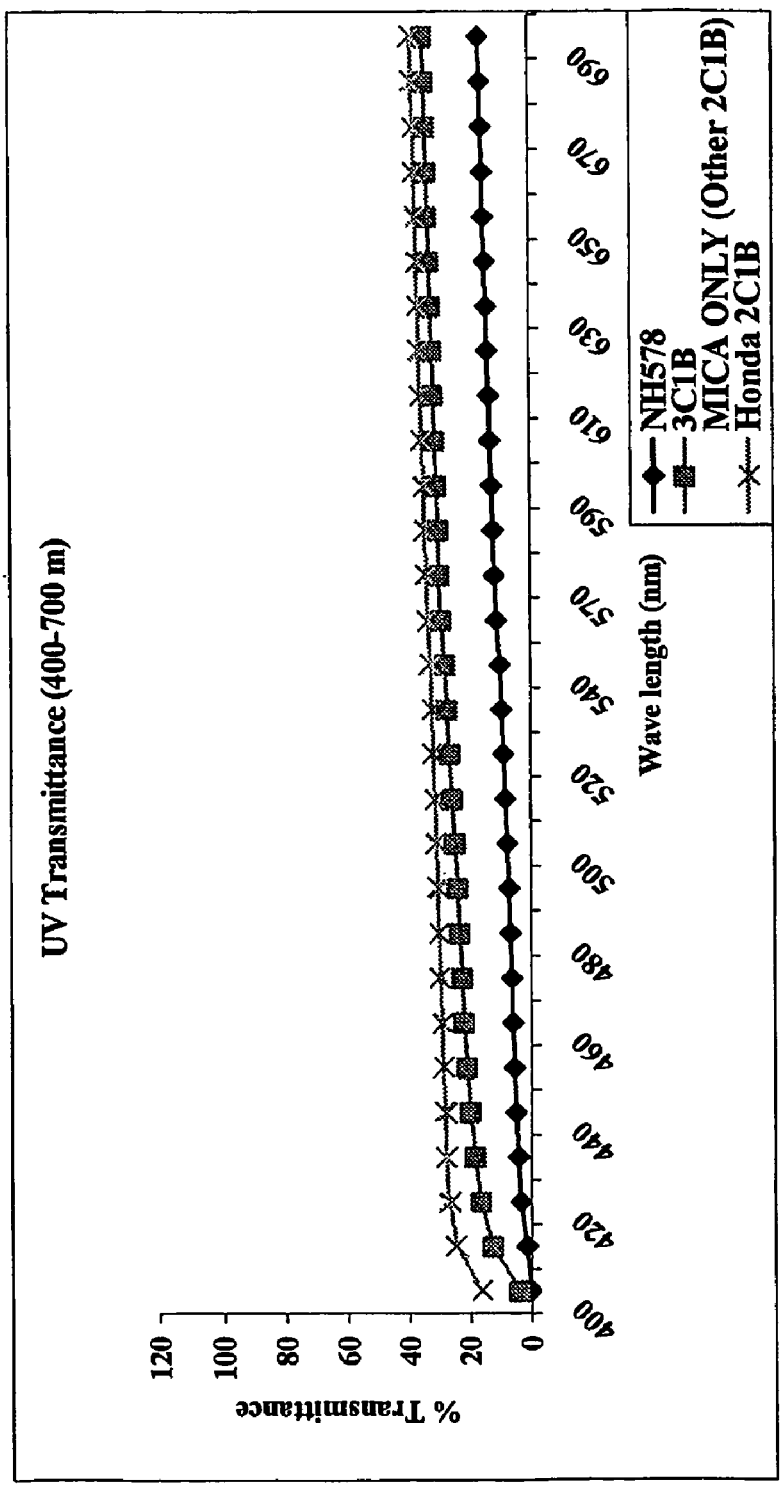

For comparison purposes, an exemplified pearlescent coating is also shown in FIG. 1*a*, this time schematically at 100. The coating is formed on a metal surface 102 with an ecoat layer 104. In this case, a first colour base layer 106 is applied to the ecoat layer 104, typically a primer coat, and a second colour base layer 108*a* is applied on the first colour base layer. A pearlescent layer 108*b* is applied to the second colour base layer 108*a* and the coating is finished with a clear coat layer 109. In this case, the pearlescent layer 108*b* has a pearlescent constituent but no other constituent which contributes to hiding. Rather, the hiding effects are left to the second colour base layer 108*a*. Thus, the single component nature of the pearlescent layer 108*b* is represented by the unidirectional cross hatching.

In order to create a pearlescent paint finish, a selected amount of reflective or pearlizing material must be added to the paint along with the colour pigment. Many pearlizing materials are known and used in the paint industry to create a pearlized finish in paint products. Any pearlizing agent may, in some cases, be used in conjunction with one embodiment of the present invention, though the most common pearlizing material is mica flakes.

A particularly preferred form of mica flakes, or alumina oxide, is available from Merck KgaA under the trade-mark XIRALLIC®. The XIRALLIC® formulation of alumina oxide is in the form of hexagonal flakes having a particle diameter greater than 10 micrometres and an aspect ratio (defined as particle diameter/thickness) of 5–10. Other less preferred flaked forms of alumina oxide can also be successfully used, either alone, or in combination with the XIRALLIC® product. The proportions of alumina oxide in different flaked forms can be varied, depending on the pigment properties desired, and upon the tolerance for increased manufacturing costs which result from the use of increased proportions of the preferred XIRALLIC®) product form.

Other pearlizing materials may include naturally occurring mica platelets which have been coated with metal oxides, synthetic materials such as alumina or silica flakes which are coated with highly refractive metal oxides such as titanium dioxide or iron oxide, bismuth oxychloride crystals, natural pearlescent guanine and hypoxanpurines obtained from fish scales. References to mica in the present description are used for illustrative purposes only, and are not intended to limit the range of pearlizing materials which may be used to create a pearlescent white finish with the white pigment of the present invention and in pigment formulations comprising the white pigment of one embodiment of the present invention.

Coloured pearlescent paint finishes other than white may be created, according to one embodiment of the present invention, by adding mica to the paint along with the paint pigments for other colours, which by definition, may have more effective hiding properties. To achieve a desirable pearlescent look, the amount of titanium dioxide should be lower than 15% of the total pigment content. Increasing the percentage of titanium dioxide in the formulation beyond this level will decrease the pearlescent effect. For example, it has been found that when the level of titanium dioxide is lower than 35%, the pearlescent coating containing it starts to present what can be described as a "pearl white". At 35% it is very lightly sparkly white. At 25% it starts to become a pearl white but not a very "clean" pearl effect due to the high level of titanium. Surprisingly, it has been found that pearlescent layers containing titanium levels below about 15% begin to develop a true white pearl but the hiding is also much lower, but in which the latter can be offset by adding a portion of aluminum oxide or other pigments with similar properties to improve hiding and reduce light transmission, to maintain white and improve sparkle.

If a pigment according to one embodiment of the present invention is used to formulate the white base-coat paint, the pigment will contribute sufficient hiding properties to the base-coat paint at a much lower weight percent, such as, for instance, ranging from about 15 to about 60 weight percent, than could be achieved by using titanium dioxide on its own as done in conventional coatings. In accordance with a preferred embodiment of the present invention, replacing at least a portion of the titanium dioxide of conventional coatings with a pigment comprising aluminum and/or one of its salts as aforementioned, instead of titanium dioxide, results in a pigment loading of within the range of %0.1– to 10% by weight of the total pigment content. The exact weight percent depends upon the final desired colour position of the white pearlescent paint. If a slightly bluish white colour is desired, the loading may exceed 10%; however, if a yellowish white colour is preferred, then loading should not exceed 10%. It has been determined, as a practical matter, that a loading of aluminum oxide as the white pigment at a level of less than 5% of total pigment will produce a desirable white pearlescent paint.

It has been further discovered that the formulation of a pearlescent coat in accordance with one embodiment of the present invention has superior hiding and UV light blocking properties when compared with conventional pearlescent coatings. In accordance with one embodiment of the present invention, a pearlescent formulation is provided for a coating material comprising a pigment composition and a substantially transparent paint backbone. In this case, a range of backbones may be used to form coatings herein described, including those backbones mentioned in the patents mentioned in the background section hereinabove. The pigment composition includes a first constituent selected to impart a pearlescent effect to the coating and a second consistent selected to hide to the naked eye local remedial sanding regions having a roughness not exceeding 500 grit, for example when the pigment composition is in a coating with a thickness of about 11 microns.

However, there may be, some cases where the pigment composition is capable of hiding roughness higher than 500 grit, for example 350 grit. For instance, there may be greater quantities of the second constituent added to the pigment composition and the thickness of the coating containing the pigment composition may exceed 11 microns.

The pearlescent coat formulation in accordance with one embodiment of the present invention has the following constituents:

| | |
|---|---|
| TiO2 | 0.1–15% |
| Mica (XIRALLIC, gold, mica, etc.) | 10–99% |
| Aluminum (fine, coarse or gold) | 0.1–20% |
| Pigment Colours (yellow, black, blue, red etc) | 0.0–5% |

The aluminum particles may be relatively large or coarse particles, that is with particle sizes ranging in size from 1 to 2 microns in thickness, and 100 to 200 microns in diameter. The coarse particles have been found to provide the surprising benefit of enhancing the pearlescent effect of the pearlescent material by imparting a "flip flop" effect (a term which is known to those of skill in the art). Moreover, the course aluminum materials aid in hiding and the blue/gray influences on the colour of the pigment as the result of using aluminum, may be compensated by a relatively small portion of titanium dioxide, for example at a range of between about 0.1% and about 7%, more preferably about 1% to about 5%. Course aluminum is available from Delta Colours Inc. and/or Silberline Mfg. Co., Inc. Aluminum is generally sold only as "aluminum pastes-leafing" or "aluminum pastes-nonleafing" in a paste according to specific particle size distribution.

The aluminum particles may also be fine particles, that is particles having a size range of 0.1 to 1 microns in thickness, and 0.1 to 100 microns in diameter. These particles may, for example, include the pigments commercially available from "Delta colours Inc." and/or Silberline Mfg. Co., Inc., which may be used as supplied or milled or otherwise processed to reduce their size, or size range profile, to suit the application.

It is believed that the desirable hiding characteristics of the pearlescent formulation according to one embodiment of the present invention are created by the hiding characteristics of the aluminum and the reflective properties of the titanium oxide. The aluminum particles in the formulation are believed to achieve hiding by blocking light, and the presence of the aluminum in the formulation will give it a blue-gray colour, particularly at higher pigment loadings, for example when the aluminum particles exceed 10 percent of the pigment composition. The titanium pigment in the formulation is a reflective substance which assists the hiding by reflecting light. The titanium pigment also offsets the blue-gray colour associated with the presences of the aluminum.

Figure 8:
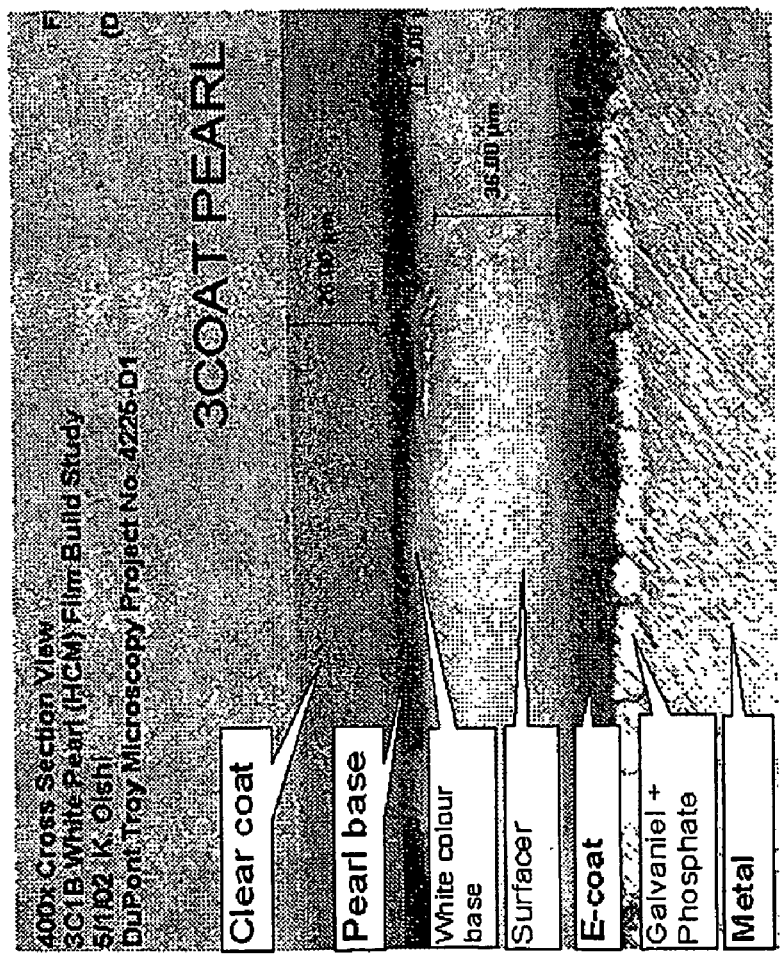
FIG. 8 is a micrograph showing one panel coating in cross section.
Figure 9:
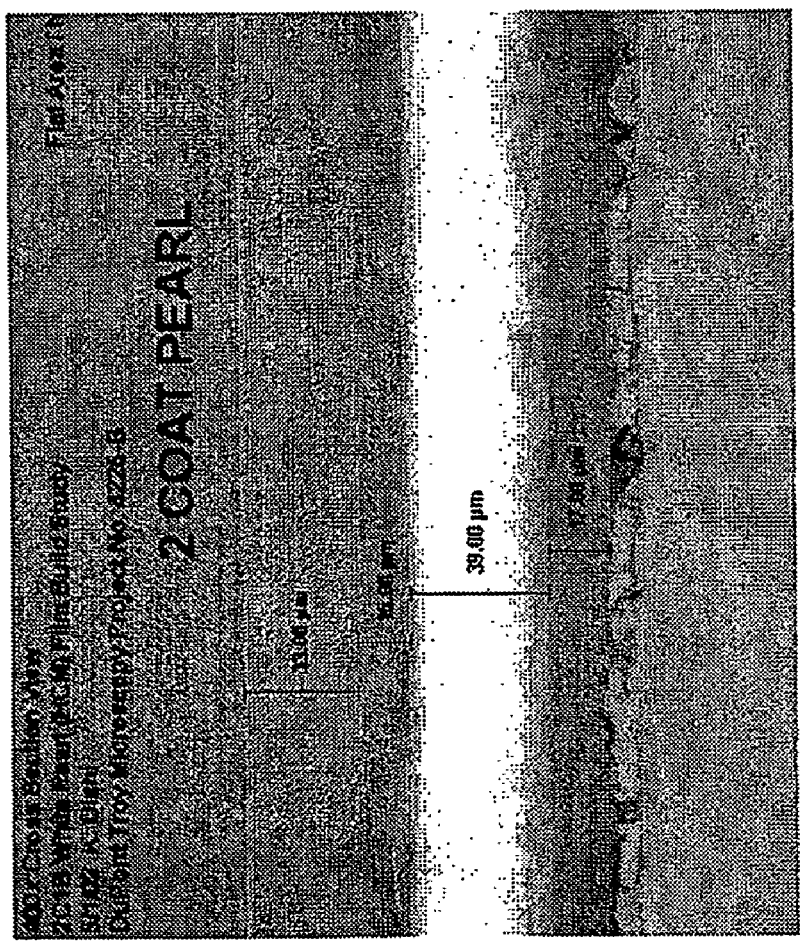
FIG. 9 is another micrograph showing another panel coating in cross section.
Figure 10:
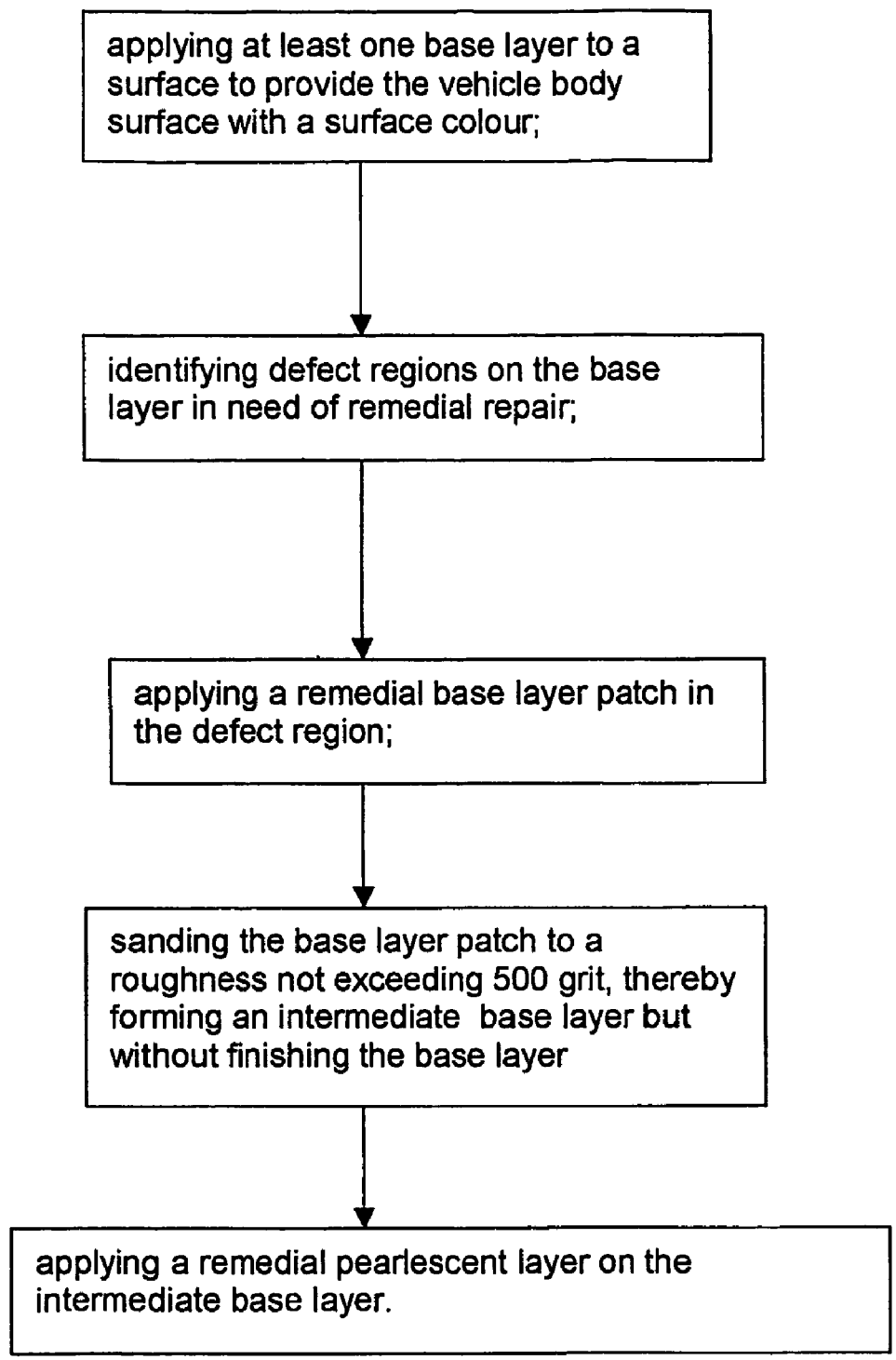
FIG. 10 is a flow diagram of a method of coating.

The pearlescent formulation according to one embodiment of the present invention is also effective at hiding and UV blocking, in some cases to the extent that the coating may be used to function in the automotive painting process in a manner analogous with a paint layer, not a pearlized clear coat layer. This functional advantage of the formulations according to one embodiment of the present invention permits the use of a 2 coat painting system instead of a 3 coat painting system to obtain a pigmented pearlized automotive paint finish. Reference may be had to FIGS. 8 and 9 in order to understand the comparison between a 2 coat and a 3 coat painting system.

Another particular feature of one embodiment of the present invention is the ability to employ polymer backbones in water based systems. This provides considerable environmental benefits, since water based systems have the advantage of very low volatile organic content (VOC), compared with their organic solvent based counterparts. In this case, the pigment loading required to employ pigments according to embodiments of the present invention can be deliver in a water system since pigment loadings are limited to 20 to 35 percent. Thus, the present pigments, in some cases, can effectively eliminate the need for the 90 percent white pigment requirement in conventional white paints and be deployed in these desirable water systems. In accordance with another of its aspects, the present invention provides a pearlescent coating for a vehicle of a particular vehicle colour, having an e-coat (electro-coat primer conventional in the painting and sealing of metal components in the automotive industry) and an outer coating applied to the e-coat. In this case, the outer coating portion includes at least one colour-containing base layer applied to the e-coat layer and a pearlescent layer applied to the primer layer. The thickness of the base layer is preferably in the range from about 15 to 40 microns, more preferably from about 30 to about 40 microns. The pearlescent layer has a thickness ranging from about 7 to 20 microns, more preferably from about 11 to about 15 microns. The pearlescent coating can be formulated to be capable, in some cases, of absorbing about 85 percent of UV radiation landing on the coating, for example under conditions wherein the coating has a thickness of 14 microns.

In another of its aspects, there is provided a method of forming a finished vehicle paint coating of a predetermined colour, comprising the step of forming at least one base layer which has colour characteristics which are at least partially determinative of a colour of the finished vehicle paint coating. A pearlescent layer is formed on the at least one base coat. The pearlescent layer contains at least one pearlescent constituent to impart a pearlescent effect on the finished vehicle paint coating and at least one physical-defect-hiding constituent to hide physical defects present on the at least one base layer of a roughness not exceeding about 500 grit. The pearlescent layer is formulated in a manner as described above.

The hiding ability of the pearlescent formulation in accordance with the present invention additionally displays a further useful advantage. Not only does pearlescent formulation achieve, in some cases, black and white hiding, as discussed above, but it also achieves physical hiding. In other words, the application of the pearlescent formulation to a slightly irregular surface will have the effect of concealing the physical irregularities in the surface, or to the changes in the localized remedial repair region, and rendering them invisible to the human eye.

Localized remedial repair regions may be, for example, a location on the vehicle where a drop of paint, a physical obstruction, such as an unwanted particle of steel or paint, for example, is embedded in the paint, both of which are determined to be removed or corrected by sanding or other processing prior to pearlescent painting.

A method of forming a finished vehicle paint coating of a predetermined colour has been developed comprising the following steps. At least one base layer is formed. The base layer has colour characteristics which are at least partially determinative of a colour of the finished vehicle paint coating. This base layer is preferably a primer layer containing pigments at least partially determinative of finished colour. On the base layer, a pearlescent layer is formed. The pearlescent layer contains at least one first pearlescent constituent to impart a pearlescent effect on finished vehicle paint coating and at least one second constituent, without which physical deformations in the at least base layer are visible in the finished vehicle paint coating. The formulation of the pearlescent layer is in accordance with the general formulation described above, and, more particularly with the specific sample formulations identified in Table 1.

In practical application on the assembly line of an automobile plant, the hiding properties of the pearlescent formulation are used to advantage in the following additional steps added to the method describe in the previous paragraph. The base layer is inspected for any painting defects such as drips or sags. If there are any such defects, defect regions on the base layer in need of remedial repair are identified. A remedial base layer patch is applied in the defect region. The base layer patch is sanded to a roughness which would be equivalent to that produced by sanding using finer sand paper than a 500 grit, for example, thereby forming an intermediate base layer but without finishing the base layer. A remedial pearlescent layer is applied on the intermediate base layer. The remedial pearlescent layer includes at least one pearlescent constituent and a sufficient quantity of at least one other remedial constituent which is present in the remedial pearlescent layer at a concentration sufficient to hide physical deformations in the intermediate base layer which are otherwise visible to the naked eye and which does not otherwise overpower the pearlescent effects of the pearlescent constituent.

Thus, one embodiment to the present invention provides a method of applying a white pearlescent finish on a vehicle by utilizing less overall pigment compared with that utilized in the prior art. In this case, a portion of the hiding requirement of the finish is contributed by a pigment, other than the pearlescent pigment. This provides the significant technical effect of reducing the mean thickness of primer coat being applied over the ecoat (or its equivalent). For example, a conventional primer coat might require a minimum mean thickness of 45 microns to provide more than the minimum hiding needed to, for example, to filter the UV light to which the finished surface will be exposed. In this case, a safety margin of say 10 percent might be imposed so that any remedial repair of an obscure location on the vehicle surface which is known to receive a statistically thinner primer coating. In this case of one embodiment of the present invention, that safety margin can still be implemented, but with less primer (for example at a mean thickness of about 30 microns, namely at about a 30% reduction), given that the pearlescent layer may also be applied to provide hiding and UV filtering as well.

In addition, it is believed that the pigments added to the pearlescent layer to provide hiding also, in some cases, contribute to the laying down of the individual pearlescent particles which, on their own in the binder, are more susceptible to adjust their positions to changes in the electrostatic charges brought about, for example in the physical sanding in a localized remedial repair region. Without the additional pigments, the pearlescent particles, themselves electrically charged particles, may be more likely to adopt an intermediate portions, for example partially upright in the pearlescent layer, which may impart a distinctly different look to that particular region, that is undesirably visible to the naked eye.

Embodiments of the present invention will be described with reference to the following examples which are presented for illustrative purposes only and are not intended to limit the scope of the invention.

EXAMPLES

Particular examples of formulations according to one embodiment of the present invention are set out in Table 1.

TABLE 1

PEARLESCENT COATING FORMULATIONS

| 5.5% pig on FW | mica, white, fine Al | mica, white, gold + co Al | mica, white, co Al + gold mica | mica, white, co Al, xir | mica, white, co Al, xir Pilot | mica, white, coarse Al, gold Al | mica, white, coarse Al, gold Al | mica, white, coarse Al, gold Al | xir, white, coarse Al, gold Al |
|---|---|---|---|---|---|---|---|---|---|
| | 33 | 34 | 35 | 36 | 37 | 38 | 39 | 40 | 41 |
| White Paint | 1.84 | 1.84 | 1.84 | 1.84 | 1.84 | 1.81 | 1.77 | 1.74 | 1.81 |
| Bal Clear | 81.25 | 81.25 | 81.25 | 81.25 | 81.25 | 79.65 | 78.12 | 76.64 | 79.65 |
| White Mica Coarse Al | 16.91 | 16.91 | 14.24 | 14.24 | 2.67 | 16.58 | 16.26 | 15.95 | 0 |
| Coarse Al Gold Mica | | 0.125 | 2.67 | 0.25 | 0.25 | 0.98 | 1.92 | 2.83 | 0.98 |
| Fine Al | 1.75 | | | | | | | | |
| Gold Al | | 0.125 | | | | 0.98 | 1.92 | 2.83 | 0.98 |
| White Xirallic | | | | 2.67 | 14.24 | 0 | 0 | | 16.58 |
| Gold Xirallic | | | | | | | | | |
| Gold Al Yellow | | | | | | | | | |
| Total Batch Weight pp/b | 24 | 24 | 24 | 24 | 24 | 24.69 | 25.36 | 26.01 | 24.59 |
| Ratios | | | | | | | | | |
| White TiO2 | 5 | 5 | 5 | 5 | 5 | 5 | 5 | 5 | 5 |
| White Mica | 95 | 95 | 95 | 80 | 15 | 95 | 95 | 95 | 0 |
| Xirallic ("Xir") | | | | 15 | 80 | | | | 95 |
| Coarse Al | | 0.25 | 0.5 | 0.5 | 0.5 | 1 | 2 | 3 | 1 |
| Gold Al | | 0.25 | | | | 1 | 2 | 3 | 1 |
| Fine Al | 0.4 | | | | | | | | |
| Yellow | | | | | | | | | |

| 5.5% pig on FW | xir, white, coarse Al, gold Al | xir, white, coarse Al, gold Al | mica, white, coarse Al, gold Al | mica, xir, white, coarse Al, gold Al | mica, xir, white, coarse Al, gold Al | mica, xir, white, coarse Al, gold Al Pilot | mica, xir, white, coarse Al, gold Al | mica, xir, white, coarse Al, gold Al | mica, xir, white, coarse Al, gold Al |
|---|---|---|---|---|---|---|---|---|---|
| | 42 | 43 | 44 | 45 | 46 | 47 | 48 | 49 | 50 |
| White Paint | 1.77 | 1.74 | 4.82 | 1.45 | 1.45 | 2.8 | 1.39 | 1.39 | |
| Bal Clear | 78.12 | 76.65 | 76.75 | 77.85 | 77.84 | 77.3 | 76.99 | 76.99 | 85.2 |
| White | | | | | | | | | 0.32 |
| White Mica Coarse Al | 0 | 0 | 13.2 | 6.34 | 6.34 | 6.1 | 5.98 | 5.98 | 12.1 |
| Coarse Al Gold Mica | 1.92 | 2.83 | 2.62 | 5.99 | 6.19 | 7.3 | 7.27 | 7.27 | 0.19 |
| Fine Al | | | | | | | 0.4 | | |
| Gold Al | 1.92 | 2.83 | 2.62 | 0.4 | 0.2 | 0.4 | 0 | 0.4 | |
| White Xirallic | 16.26 | 15.95 | 0 | 7.98 | 7.99 | 6.1 | 7.97 | 7.97 | 2.19 |
| Gold Xirallic | | | | | | | | | |
| Gold Al Yellow | | | | | | | | | |

TABLE 1-continued

PEARLESCENT COATING FORMULATIONS

| | | | | | | | | | |
|---|---|---|---|---|---|---|---|---|---|
| Total Batch Weight pp/b Ratios | 25.25 | 25.9 | 24 | 24.04 | 24.06 | 22.81 | 24.26 | 24.28 | 24 |
| White TiO2 | 5 | 5 | 15 | 5 | 5 | 5 | 10 | 5 | 5 |
| White Mica | 0 | 0 | 85 | 45 | 45 | 45 | 45 | 45 | 80 |
| Xirallic | 95 | 95 | 0 | 50 | 50 | 45 | 50 | 50 | 15 |
| Coarse Al | 2 | 3 | 3 | 7.5 | 7.75 | 7.5 | 7.5 | 9.5 | 0.5 |
| Gold Al | 2 | 3 | 3 | 0.5 | 0.25 | 0.5 | 0 | 0.5 | 0 |
| Fine Al Yellow | | | | | | | 0.5 | 0 | 0 |

| 5.5% pig | mica, xir, white, coarse Al, gold Al | mica, xir, white, coarse Al, gold Al | mica, xir, white, coarse Al, gold Al | mica, xir, white, coarse Al, gold Al | mica, xir, white, coarse Al, gold Al | mica, xir, white, coarse Al, gold Al Pilot | mica, xir, white, fine Al, gold Al | mica, xir, white, fine Al, gold Al | mica, xir, white, fine Al, coarse Al, gold Al |
|---|---|---|---|---|---|---|---|---|---|
| on FW | 51 | 52 | 53 | 54 | 55 | 56 | 57 | 58 | 59 |
| White Paint Bal Clear | 85.12 | 85.09 | 83.93 | 83.74 | 83.5 | 83.33 | 83.93 | 83.50 | 84.541 |
| White | 0.32 | 0.32 | 0.32 | 0.31 | 0.35 | 0.35 | 0.32 | 0.35 | 0.32 |
| White Mica | 12.09 | 9.06 | 7.39 | 7.38 | 7.36 | 7.34 | 7.39 | 7.36 | 6.69 |
| Coarse Al | | | | | | | | | |
| Coarse Al | 0.19 | 0.19 | 0.19 | 0.37 | 0.6 | 0.8 | | | |
| Gold Mica | 2.19 | 5.25 | 8.08 | | | | | | |
| Fine Al | | | | | | | 0.19 | 0.60 | 1 |
| Gold Al | | | | 0.09 | 0.1 | 0.1 | 0.09 | 0.10 | 0.09 |
| White Xirallic | | | | 8.11 | 8.09 | 8.08 | 8.09 | 8.09 | 7.36 |
| Gold Xirallic | | | | | | | | | |
| Gold Al Yellow | | | | | | | | | |
| Total Batch Weight | | | | | | | 100.00 | 100.00 | 100.001 |
| pp/b Ratios | 24.03 | 24.07 | 25.92 | 26.07 | 62.3 | 26.39 | 24 | 26.2 | 24 |
| White TiO2 | 5 | 5 | 5 | 5 | 5 | 5 | 5 | 5 | 5 |
| White Mica | 80 | 60 | 45 | 45 | 45 | 45 | 45 | 45 | 45 |
| Xirallic | 15 | 35 | 50 | 50 | 50 | 50 | 50 | 50 | 50 |
| Coarse Al | 0.5 | 0.5 | 0.5 | 1 | 1.5 | 2 | 0 | 0 | 0 |
| Gold Al | 0.2 | 0.2 | 0.2 | 0.2 | 0.2 | 0.2 | 0.2 | 0.2 | 0.2 |
| Fine Al Yellow | 0 | 0 | 0 | 0 | 0 | 0 | 0.5 | 1.5 | 2 |

| 5.5% pig | mica, xir, white, fine Al, coarse Al, gold Al | mica, xir, white, fine Al, coarse Al, gold Al | mica, xir, white, fine Al, coarse Al, gold Al | mica, xir, white, fine Al, coarse Al, gold Al | mica, xir, white, fine Al, coarse Al, gold Al | mica, xir, white, fine Al, coarse Al, gold Al, gold mica Pilot | mica, xir, white, fine Al, coarse Al, gold Al, sunbeam gold xir | mica, xir, white, fine Al, coarse Al, gold Al, sunbeam gold xir |
|---|---|---|---|---|---|---|---|---|
| on FW | 60 | 60B | 61 | 62 | 63 | 64 | 65 | 66 | 67 |
| White Paint Bal | 84.477 | 83.45 | 83.87 | 83.86 | 83.34 | 83.87 | 83.87 | | 83.87 |

TABLE 1-continued

PEARLESCENT COATING FORMULATIONS

| Clear | | | | | | | | | |
|---|---|---|---|---|---|---|---|---|---|
| White | 0.32 | 0.34 | 0.4 | 0.48 | 0.53 | 0.4 | 0.4 | | 0.4 |
| White Mica | 6.65 | 7.09 | 6.36 | 6.28 | 8.16 | 6.36 | 6.36 | | 6.36 |
| Coarse Al | | | | | | | | | |
| Coarse Al Gold Mica | 0.4 | 0.43 | 0.41 | 0.43 | 0.55 | 0.41 | 0.41 | 2.04 | 0.41 4.08 |
| Fine Al | 0.75 | 0.8 | 0.77 | 0.8 | 1.03 | 0.77 | 0.77 | | 0.77 |
| Gold Al | 0.09 | 0.1 | 0.09 | 0.1 | 0.12 | 0.09 | 0.09 | | 0.09 |
| White Xirallic | 7.32 | 7.79 | 8.39 | 8.28 | 8.16 | 6.12 | 4.08 | 6.12 | 4.08 |
| Gold Xirallic | | | | | | | 2.04 | | 4.08 |
| Gold Al Yellow | | | | | | | | | |
| Total Batch Weight | 100.007 | 99.98 | 100 | 100 | 100 | 100 | 100 | 100 | 100 |
| pp/b Ratios | 24 | 26 | 26 | 26 | 26 | 26 | 26 | 26 | 26 |
| White TiO2 | 5 | 5 | 6 | 7 | 8 | | | | |
| White Mica | 45 | 45 | 40.7 | 40.3 | 39.8 | | | | |
| Xirallic | 50 | 50 | 53.7 | 53.1 | 52.6 | | | | |
| Coarse Al | 1 | 1 | 1 | 1 | 1 | | | | |
| Gold Al | 0.2 | 0.2 | 0.2 | 0.2 | 0.2 | | | | |
| Fine Al Yellow | 1.5 | 1.5 | 1.5 | 1.5 | 1.5 | | | | |

| | | mica, xir, white, fine Al, coarse Al, gold Al, yellow | mica, xir, white, fine Al, coarse Al, gold Al, yellow |
|---|---|---|---|
| | | Pilot | |
| 5.5% pig on FW | | 68 | 69 |
| White Paint | | | |
| Bal | Clear | 83.57 | 83.57 |
| | White | 0.4 | 0.4 |
| White | Mica | 6.35 | 6.34 |
| Coarse | Al | | |
| Coarse | Al | 0.41 | 0.41 |
| Gold | Mica | | |
| Fine | Al | 0.77 | 0.77 |
| Gold | Al | 0.09 | 0.09 |
| White | Xirallic | 8.38 | 8.37 |
| Gold | Xirallic | | |
| Gold | Al | 0.2 | 0.4 |
| Yellow | | | |
| Total | Batch | 100 | 100 |
| Weight | | | |
| pp/b Ratios | | 26 | 26 |
| White | TiO2 | 5.8 | 5.8 |
| White | Mica | 39.4 | 39.3 |
| Xirallic | | 52 | 52 |
| Coarse | Al | 1 | 1 |
| Gold | Al | 0.2 | 0.2 |
| Fine | Al | 1.4 | 1.4 |
| Yellow | | 0.17 | 0.34 |

Black and white testing to determine the hiding properties of the pearlescent coating according to one embodiment of the present invention gave the following results. A layer of pearlescent coating according to one embodiment of the present invention and having a formulation in accordance with pilot sample 63 in table 1 achieved black and white hiding if applied in a layer 90 microns thick. By contrast, a coating of conventional pearlescent white mica (XIRALLIC™ by itself) achieved the same hiding if applied in a layer at least 581 microns thick.

Tests have been performed to assess the UV radiation filtering ability of the pearlescent formulation according to one embodiment of the present invention.

Samples of selected the pearlescent formulations were tested by exposure to UV radiation for an extended periods of time (for percent light transmission) by following method, Preparation: Each film was free of substrate. Primer was sprayed out on PP (poly-propylene) plaques while the top coat only panels were sprayed out on Mylar sheets. This is due to the concern of Top coat UV stabilizer package migrating into the PP. The primer was sprayed out in a wedge over 2 panels from 0 to 57 microns.

Test method: The film was placed in the middle cell of an autographic spectrophotometer (measure the spectral transmittance) fixture and scanned from 705 to 297 nm in 1 nm increments. Surface area (% nm) was internally calculated by the machine for the UV and visible regions. A mark was made on the top of the strip to indicate where to measure film thickness where each measurement occurred. Machine error was less than 1%, however, care needs to be taken that the entire cell window is filled with the free film sample.

A control sample of a pearlescent formulation containing only mica was subjected to the same test conditions. The data obtained is identified in Table 2 below, where the right hand column shows the application of UV radiation at increasing wavelengths, and the remaining columns show the wavelength of the light in nanometers. The columns indicate type of paint.

| | |
|---|---|
| MICA - | XIRALLIC only pearl coat 14µ film thickness |
| 2C1B - | Honda pearl coat at 14µ film thickness |
| 3C1B - | Conventional 3-coat white pearl (7µ colour base and 7µ pearl base) - total film thickness is 14µ |
| White - | Conventional flat white paint at 14µ film thickness |
| Gold - | Gold coloured paint at 14µ film thickness. |

TABLE 2

UV TRANSMITTANCE

| Wavelength | MICA | 2C1B | 3C1B | WHITE | GOLD |
|---|---|---|---|---|---|
| 300 | 5.45 | 0.03 | 0.12 | 0.02 | 0.17 |
| 310 | 5.23 | 0.01 | 0.03 | 0.03 | 0.14 |
| 320 | 7.91 | 0.01 | 0.18 | 0.04 | 0.09 |
| 330 | 6.52 | 0.05 | 0.01 | 0.01 | 0.07 |
| 340 | 4.23 | 0.03 | 0.02 | 0.09 | 0.04 |
| 350 | 4.01 | 0.01 | 0 | 0.06 | 0.04 |
| 360 | 6.88 | 0.06 | 0.02 | 0.01 | 0.06 |
| 370 | 16.38 | 0.1 | 0.02 | 0 | 0.4 |
| 380 | 42.7 | 0.74 | 0.02 | 0 | 2.2 |
| 390 | 79.5 | 4.13 | 0.14 | 0.01 | 7 |
| 400 | 95.35 | 12.69 | 1.87 | 0.09 | 9 |

Turning now to FIG. 1, in order to demonstrate the effectiveness of the pearlescent formulations according to one embodiment of the present invention, the data was plotted in a graph of percentage transmittance of UV radiation against increasing wavelength of UV radiation.

The graph clearly demonstrates that as wavelength increases, the transmittance of UV radiation through the mica only control sample increases significantly, peaking at almost 100% at 400 nm. By contrast, the pearlescent formulations demonstrate impressive UV radiation filtering ability, with the percent transmittance being less than 10% at 400 nm.

Tests have been performed to assess and demonstrate the physical hiding ability of the pearlescent formulation. A primed surface was abraded with sanding grit of standardized roughness, being 100, 200, 300, 360, 400, 500, 600, 700, and 800 grit. A pearlescent formulation in accordance with the present invention, in particular a formulation having the ingredients specified in pilot sample 63 identified in Table 1. was applied to the abraded test surfaces in accordance with standard paining practices in the automotive industry. The pearlescent formulation was applied in a layer 11 microns thick. The test results demonstrated that abrasions of a roughness of 500 grit were not visible to the naked eye after the application of the pearlescent formula. The application of the pearlescent formulation to the 360 grit abrasion did not cover all scratches, and similarly, coarser abrasions were not hidden.

While the present invention has been described for what are presently considered the preferred embodiments, the invention is not so limited. To the contrary, the invention is intended to cover various modifications and equivalent and other arrangements that make use of a regenerator to substantially restore the initial starting temperature included within the spirit and scope of the appended claims.

While the pigments, coatings and methods above described are applied to vehicle surfaces, it will be understood that they are also usable on other surfaces, such as those covering a range of industrial and personal products, plastics, metals and the like. Therefore, the above description is not intended to limit the invention entirely to the preferred field of vehicle surfaces.

What is claimed is:

1. A pearlescent white paint composition suitable for providing a pearlescent finish on a vehicle body surface comprising a solids material and a film-former, said solids material comprising 85–95% w/w mica, 5–8% w/w $TiO_2$ and 0.4–2.70% w/w particulate metallic Al.

2. A paint composition as defined in claim 1 wherein said solids material comprises 92.4–95% w/w mica, 5–8% w/w $TiO_2$ and 0.7–2% wlw Al.

3. A paint composition as defined in claim 1 in a formulation base selected from the group consisting of an aqueous, solvent and lacquer base.

4. A process for producing a pearlescent white finish on a substrate comprising applying a pearlescent white paint composition as defined in claim 1 to said substrate; and curing said composition on said substrate to provide a cured said finish.

5. A process as defined in claim 4 further comprising applying a clear coat to said cured finish and curing said clear coat.

6. A process as defined in claim 4 or claim 5 wherein said substrate is a vehicle body.

7. A substrate coated with a cured pearlescent white finish when made by the process as defined in claim 5.

8. A coated substrate as defined in claim 7 wherein said substrate is a vehicle body.

* * * * *